3,295,889
MOTOR VEHICLE SEAT
Rudolf A. Lorenz, 66 Bismarckstrasse, Berlin-Charlottenburg, Germany
Filed May 26, 1964, Ser. No. 370,295
Claims priority, application Germany, May 29, 1963,
L 44,984
1 Claim. (Cl. 297—299)

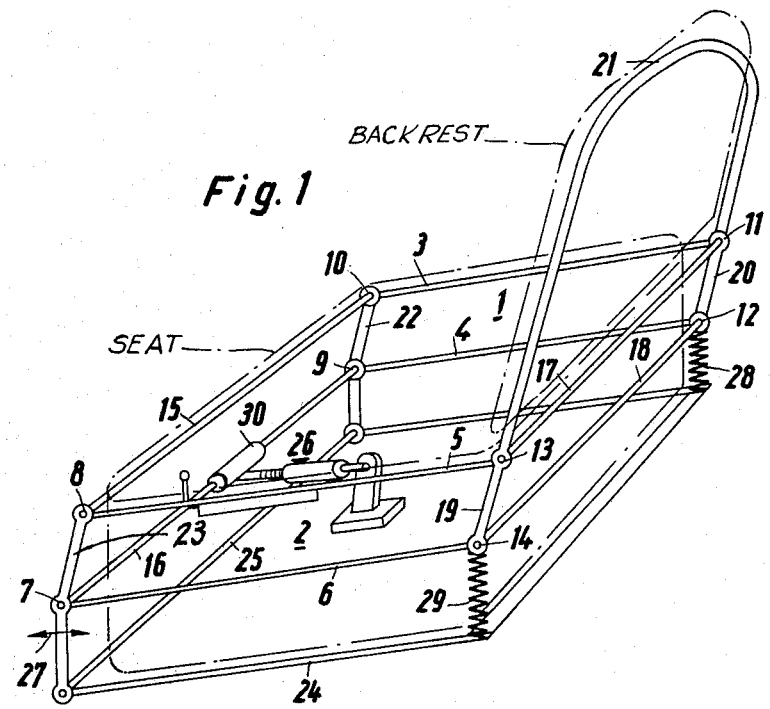
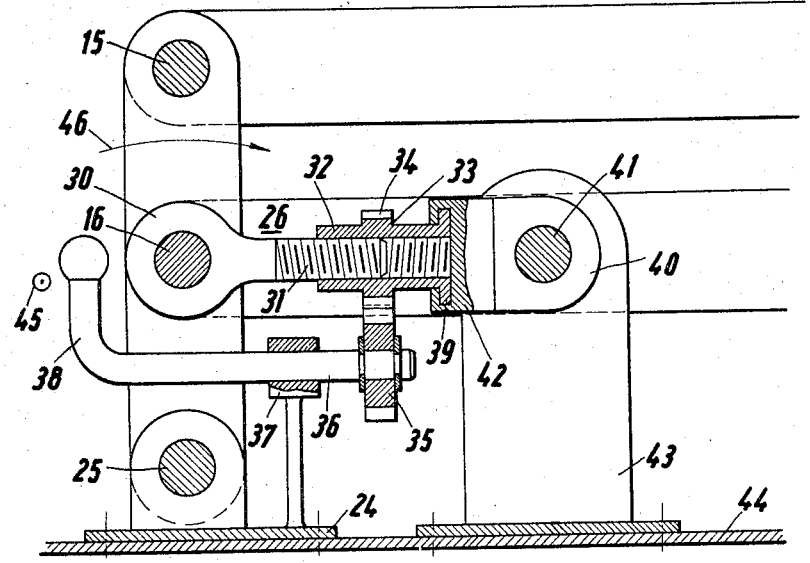

My present invention relates to a motor-vehicle seat and, more particularly, to a motor-vehicle seat for private automobiles.

Conventional motor-vehicle seats as have been used generally heretofore provide a seating portion supported by springs and other cushioning systems but, for the most part, have back rests which do not follow the oscillations of the vehicle driver or the user of the seat so that there is a relative movement of the back of the user and the back rest which causes fatigue.

It is the principal object of the present invention to provide a seat assembly for automotive vehicles which overcomes this disadvantage.

This object and others which will become apparent hereinafter are attained, in accordance with the present invention, by providing a seat assembly for a motor vehicle in which the seat-forming portion of the assembly is mounted in the customary manner while the back rest is carried on a parallelogrammatic linkage for movement in the vertical direction generally parallel to itself, the linkage being pivotally connected to the vehicle body.

According to a more specific feature of this invention, the parallelogrammatic linkage comprises relatively short guide rods at the back rest and a forward portion of the linkage interconnected with generally horizontal rods by pivots extending along the seat portion of the assembly. A pair of such parallelogrammatic linkages can be provided along the flanks of the seat portion and can be coupled by further rods forming with the parallelogrammatic linkages a frame for the seat portion. Advantageously, spring means are provided, preferably at a rearward portion of the assembly proximal to the back rest, for maintaining the frame in a normal, generally horizontal position.

Another feature of this invention resides in the provision of adjustment means (e.g. adjusting screws, spring-loaded pawls) for varying the inclination of the short guide rods with respect to the body floor of the vehicle. This arrangement simultaneously effects a variable inclination of the back rest which is maintained as the parallelogrammatic linkage swings with the back rest when engaged by the back of the user.

The parts of the assembly are thus synchronously damped with respect to oscillations about an adjustable median plane so that the spring characteristic between the vehicle body and the wheel axles can be made substantially harder than has been possible heretofore to improve the road-hugging characteristics of the vehicle without impairing driving character.

The height of a seat assembly, according to the invention, is not greater than that of ordinary seats so that the assembly can be used with particular advantage for sports cars with their comparatively hard springs.

The above and other objects, features and advantages of the present invention will become more readily apparent from the following description, reference being made to the accompanying drawing in which:

FIG. 1 is a perspective view of the frame of a motor-vehicle seat assembly according to the present invention; and FIG. 2 is a fragmentary cross-sectional view through an adjusting means for varying the inclination of the back rest of the assembly.

Referring now to FIG. 1, wherein the seat and backrest are shown in dot-dash lines it will be seen that the frame of the seat assembly comprises a pair of parallelogrammatic linkages generally designated 1 and 2 and pivotally mounted upon the floor of the vehicle body as will become apparent hereinafter. The linkages 1 and 2 comprise relatively long rods 3–6 which extend in the longitudinal direction of the vehicle and are designed to flank the vehicle seat which, for purposes of clarity, is not illustrated in place in FIG. 1 but is received between the parallelogrammatic linkages as indicated in FIG. 3. The rods 3–6 of the linkages are pivotally connected to the short rods thereof via pivots 7–14 of which the pivots 7, 9; 8, 10; 7, 13; and 12, 14 are interconnected by transverse rods 15–17, respectively, which bridge the parallelogrammatic linkages 1 and 2 and complete the frame for the seat portion. This frame is rigid with respect to lateral deformation and the upholstered seat portion can be mounted therein in any convenient manner. The parallelogrammatic linkages include a pair of rear short rod portions 19 and 20 which extend upwardly beyond the linkages and are interconnected at their upper part by the curved section 21 forming a frame for the mounting of the back rest. The two front short rod portions 22 and 23 are extended downwardly beyond the pivot 7 and 9 and are pivotally connected with a transverse rod 25 which, in turn, can be rigidly connected with the vehicle 4 or, as illustrated in FIG. 1, with frame structure 24 secured to the floor. The inclination of the rods 22 and 23 can be adjusted in both senses (arrow 27) about the pivot formed by rod 25 by means of an adjusting means 26 shown in detail in FIG. 2. It will be apparent that the parallelogrammatic linkages 1 and 2 insure that the opposite longitudinal rods and short rod portions always move in a mutually parallel relationship upon pivoting movement of the assembly. Thus one is able to adjust, within relatively wide limits, inclinations of the frame part 21, of the back of this assembly.

The assembly further comprises a pair of springs 28 and 29 which support the back rest and bear upon the parallelogrammatic linkages at the pivots 14 and 12. While coil springs of helical configuration are illustrated here, it will be understood that other springs can be employed as the spring means and that such spring means may bear upon the parallelogrammatic linkages at different locations from that illustrated. It is essential only that, once the inclination of the back rest has been adjusted, the entire frame supporting the back rest performs elastically damped oscillations with a vertical component within the range of the swinging movement afforded by the parallelograms 1 and 2 under the influence of the vibrations occurring during operation of the vehicle. The oscillatory frequencies of the seat portion and the back rest, while these are not connected, are thus identical. Since the oscillatory amplitudes of the rear portion of the seat and of the frame 21 and the back rest carried thereby, are substantially identical, there is no relative movement between the back of the seated person and the back rest as is the case with the usual vehicle-seat constructions. Tiring of the user is thus delayed substantially. Moreover, a vehicle seat according to the present invention is particularly advantageous in small vehicles because in vehicles of this type the upholstery is generally weak in order to obtain better space utilization and the spring suspension of the vehicles body is comparatively stiff.

The adjusting means 26 for the assembly of FIG. 1 is shown in greater detail in FIG. 2 and comprises a cylindrical socket 30 extending over the transverse rod 16 and to which is welded a threaded bolt 31. The bolt 31 is threadedly interconnected with the internally threaded sleeve 32 which has a collar 34. The toothed collar 34 forms a pinion meshing with a toothed wheel 35 keyed to a rod 36 rotatably supported by a block 37 on the floor of the vehicle body and rotatable by means of handles 38. At the right-hand end of the sleeve 32, a flange 39 is provided; this flange is rotatable within an annular groove in an anchor 42 pivotally mounted on a bolt 41 by means of a member 40. The bolt 41 is, in turn, fixed to the support block 43 which is bolted or welded to the vehicle floor 44. The handle 38 is rotated, e.g. in the direction of arrow 45, the bolt 41 is threaded into the socket 32 by virtue of the right-hand thread upon the bolt 31. The socket 32 is rotated by the wheel 35 which is driven by the pinion 34. Since the socket 32 is secured in the anchor 42, the axial motion of the threaded bolt 31 swings the rod portions 22 and 23 about the axis defined by the transverse rod 24 in the direction of arrow 46. Reverse rotation of the handle 38, of course, results in a reverse pivoting motion of the rod portions 22 and 23. Since the back rest follows the inclination of the rods 22 and 23, the back rest inclination can be adjusted within relatively wide limits. The back rest is, however, always shifted parallel with respect to itself and relative movement between the back of the seated person and the back rest is precluded.

What I claim is:

A motor-vehicle seat assembly for a motor-vehicle body, comprising a seat portion and a back rest disposed proximal to a rear part of the seat portion; a pair of parallelogrammatic linkages flanking said seat portion and having respective relatively long rods extending in longitudinal direction along said seat portion, and mutually parallel relatively short rod portions at front and rear extremities of each linkage, the relatively short rod portions at the rear of said linkages being connected with said back rest, the relatively short rod portions at the front of said linkages being pivoted to the floor of said body whereby the back rest is oscillatable with a vertical component generally parallel to itself with respect to said seat portion; resilient means bearing upwardly upon at least one of said parallelogrammatic linkages for movably supporting said back rest, said parallelogrammatic linkages having corresponding pivots interconnecting said short rod portions and said rods, further comprising transverse rods interconnecting the corresponding pivots of said parallelogrammatic linkages and extending along front and rear portions of said seat portion and defining with said parallelogrammatic linkages a frame for said seat portion, said resilient means including at least one spring bearing upon said frame for resiliently supporting said back rest, said short rod portions at the rear of said parallelogrammatic linkages extending upwardly and being interconnected at an upper portion for forming a further frame for said back rest; and adjusting means mounted upon the floor of said body and engageable with one of said transverse rods for varying the inclination of said short rod portion to vary the inclination of said back rest.

References Cited by the Examiner

UNITED STATES PATENTS

| 2,357,825 | 9/1944 | Hickman | 297—346 |
| 2,799,326 | 7/1957 | Liljengren | 297—299 |

FOREIGN PATENTS

| 528,001 | 4/1954 | Belgium. |
| 831,304 | 5/1938 | France. |

FRANK B. SHERRY, *Primary Examiner.*

J. S. PETRIE, R. B. FARLEY, G. O. FINCH,
*Assistant Examiners.*